(12) United States Patent
Wallerstorfer et al.

(10) Patent No.: US 9,474,409 B2
(45) Date of Patent: Oct. 25, 2016

(54) CLEANING DISPENSER

(75) Inventors: Kurt Wallerstorfer, Strasswalchen (AT); Bernd Heitele, Marbach (CH)

(73) Assignee: AQUIS WASSER-LUFT-SYSTEME GMBH, Lindau, Zweigniederlassung Rebstein, Rebstein (CH)

( * ) Notice: Subject to any disclaimer, the term of this patent is extended or adjusted under 35 U.S.C. 154(b) by 20 days.

(21) Appl. No.: 14/241,053

(22) PCT Filed: Aug. 21, 2012

(86) PCT No.: PCT/EP2012/003538
§ 371 (c)(1),
(2), (4) Date: Feb. 25, 2014

(87) PCT Pub. No.: WO2013/026567
PCT Pub. Date: Feb. 28, 2013

(65) Prior Publication Data
US 2014/0197193 A1    Jul. 17, 2014

(30) Foreign Application Priority Data

Aug. 25, 2011 (DE) .......................... 10 2011 111 177

(51) Int. Cl.
*B67D 1/08* (2006.01)
*A47J 31/60* (2006.01)

(52) U.S. Cl.
CPC ..................... *A47J 31/60* (2013.01)

(58) Field of Classification Search
CPC ................................ A47J 31/60; A47J 31/32
USPC ....................... 222/148, 383.2, 63, 325, 333; 99/279–323
See application file for complete search history.

(56) References Cited

U.S. PATENT DOCUMENTS

| | | | | |
|---|---|---|---|---|
| 4,305,328 | A | * | 12/1981 | Kueser et al. ................. 99/283 |
| 5,795,390 | A | * | 8/1998 | Cavallaro ..................... 118/314 |
| 7,387,221 | B2 | * | 6/2008 | Masuda ........................ 222/333 |
| 2009/0293733 | A1 | | 12/2009 | Martin et al. |
| 2012/0305597 | A1 | * | 12/2012 | Larzul et al. ................. 222/148 |

FOREIGN PATENT DOCUMENTS

| | | |
|---|---|---|
| CH | 665 945 A5 | 6/1988 |
| DE | 37 09 161 C2 | 5/1989 |
| DE | 197 29 220 A1 | 1/1998 |
| DE | 10 2005 024 059 A1 | 12/2005 |
| DE | 10 2008 003 733 A1 | 7/2009 |
| DE | 10 2009 051 865 A1 | 5/2011 |
| DE | 10 2011 081 010 A1 | 2/2013 |
| EP | 1 210 894 A1 | 6/2002 |
| EP | 1 578 235 B1 | 9/2005 |
| EP | 1 803 934 A1 | 7/2007 |
| EP | 1 863 723 B1 | 12/2007 |
| EP | 1 901 639 B1 | 3/2008 |
| EP | 2 078 481 A1 | 7/2009 |
| GB | 2 325 179 A | 11/1998 |
| WO | WO 2013/026567 A1 | 2/2013 |

* cited by examiner

*Primary Examiner* — Patrick M Buechner
*Assistant Examiner* — Jeremy W Carroll
(74) *Attorney, Agent, or Firm* — Breneman & Georges

(57) ABSTRACT

The present invention relates to a beverage machine, more particularly for preparing hot drinks, with a liquid cleaner replaceable container formed as a replaceable container, characterized in that parts of a liquid cleaner dosing device are formed interchangeable with the liquid cleaner replaceable container.

23 Claims, 5 Drawing Sheets

CLEANING DISPENSER

Figure 1:
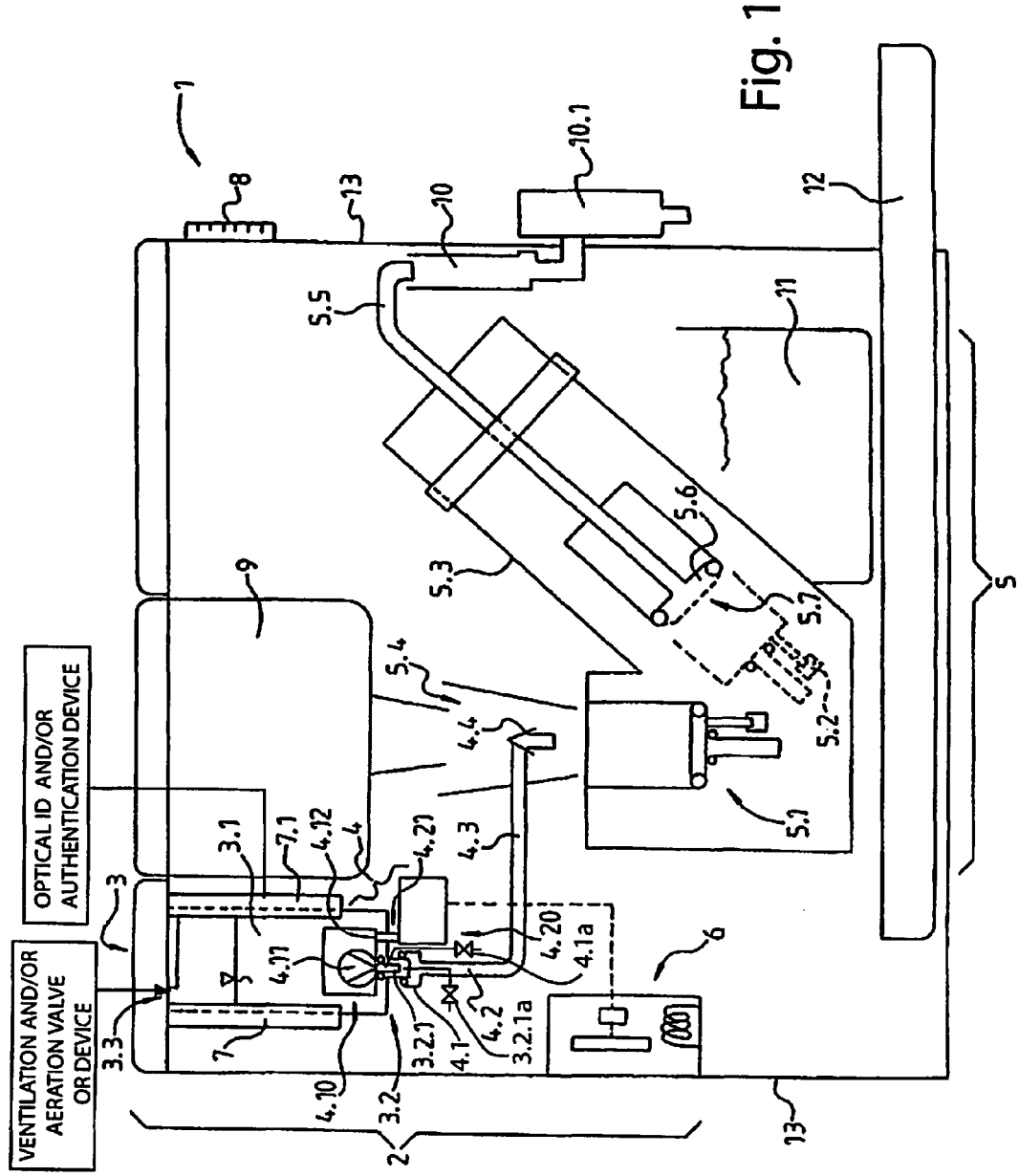

The present invention relates to a beverage machine according to the preamble of claim 1.

PRIOR ART

Beverage machines are commercially known, more particularly for preparing hot drinks. As a rule a drinks base, such as for example soup, cocoa, or coffee powder or the like, is here mixed and/or brewed with hot water and/or steam in a processing unit of the machine.

Beverage machines are further known in the form of fully automatic coffee machines in which coffee powder ground immediately prior to brewing from beans stored in a corresponding container is supplied to a brewing unit provided for preparing the coffee and is then brewed by means of pressurized steam into the coffee which is dispensed from the fully automatic coffee machine.

In order to maintain the functionality of the fully automatic coffee machine, more particularly of all its components belonging to the brewing unit, it is necessary to carry out from time to time certain servicing, more particularly cleaning, processes. The same also applies for the beverage machines indicated above.

Different beverage machines with automatic cleaning processes have already become known. Such beverage machines are described by way of example in EP 157 8235, U.S. Pat. No. 4,305,328, DE 19729220 A1, EP 1901639 B1 and US 20009/0293733 A1.

Furthermore dosing pumps for supplying liquids in beverage machines are known in various specifications, by way of example in DE 102005024059 A1, EP 1803934 A1, EP 1863723 B1 and DE 3709161 C2.

OBJECT AND ADVANTAGES OF THE INVENTION

The object of the present invention is to improve a beverage machine according to the prior art outlined at the beginning.

This is achieved according to a first aspect of the invention starting from a beverage machine according to the preamble of claim 1 through the characterizing features thereof.

Advantageous expedient developments are indicated in the dependent claims.

The present invention correspondingly relates to a beverage machine, more particularly for the preparation of hot drinks, having a liquid cleaner container designed as a replaceable container. This is characterized in that it is formed as an interchangeable part of a liquid cleaner dosing device. The refilling process with liquid cleaner is hereby simplified in the machine according to the invention.

This further has the advantage that those parts of the dosing device which come into direct contact with the liquid cleaner can be integrated in the liquid cleaner replaceable container. This can thus be filled and then completely closed.

A liquid cleaner replaceable container closed in this way has the advantage for the user that he need only remove this container from a package and exchange it for an empty cleaning agent replaceable container which is located in the beverage machine. As a result of this closed embodiment any contact with the cleaning liquid supplied in the liquid cleaner replaceable container can be avoided in a user-friendly way.

According to the invention the interchangeable replaceable container comprises a dosing pump for the liquid cleaner. This is particularly advantageous with regard to a component structure closed on the outside whereby, as described above, an uncomplicated and tidier container exchange can be possible.

Furthermore, according to the invention the beverage machine is provided with a pipeline coupling between the replaceable container and the beverage machine for coupling up a liquid cleaner pipeline, and with a drive coupling for mechanically coupling a drive of the dosing pump.

This enables on the one hand a continuous liquid cleaner pipeline and thus the supply of cleaner according to the invention in conjunction with a replaceable container, and moreover the possibility of providing the drive for the dosing pump outside of the replaceable container on the machine side. It is thus important particularly with regard to this that a liquid pump integrated at least in part in the liquid container is replaced with the replaceable container. The drive motor on the other hand can remain on the machine side whereby the expense on the part of the replaceable container is reduced.

Preferably the pipeline coupling for the cleaner pipeline is designed so that it remains fixed during operation. This reduces on the one hand the structural expense and provides the sealing tightness of the cleaner pipeline.

The dosing pump is furthermore preferably designed so that it comprises a rotor wherein a drive motor to be coupled to the rotor is mounted offset and/or at an angle relative to the axis of the pump rotor or its drive coupling. On the one hand the mechanical coupling of a pump drive can be achieved more easily via a rotational movement than for example by a push rod, particularly with regard to the exchangeability of the replaceable container. On the other hand particularly when the drive motor is not in alignment with the pump rotor a space-saving arrangement of the drive motor can be provided on the machine side. This is particularly advantageous in the base area of a replaceable container where the volume is to be used as much as possible for holding the cleaner.

It is furthermore advantageous when the liquid connection of the replaceable container is arranged off-set relative to the axis of the pump rotor of the dosing pump. On the one hand the fixed configuration of the first coupling for connecting the liquid cleaner pipeline hereby becomes easier. On the other hand an overall flatter construction is also hereby possible in the base area of the replaceable container.

In one specific embodiment at least one gearing element is to this end provided for spanning any off-set stagger and/or angle between the rotor or the drive coupling and the drive motor of the dosing pump. By using such a gear element, by way of example a gearwheel or the like, the possibility is provided of achieving the flat construction described at the base of the replaceable container where couplings for the mechanical drive of the dosing pump on the one hand and for the liquid cleaner pipeline on the other hand are spaced apart from one another.

Furthermore a gearing element can also serve as a transmission or reduction means in order by way of example to be able to use a less powerful or slower motor. All possible gearing elements can hereby be considered, by way of example a belt drive or the like could also be provided. In a particularly compact and thus space-saving structural design a fixed cleaner pipeline is mounted coaxial with a rotating drive or gearing element, e.g. a gearwheel.

In a preferred embodiment the dosing unit can comprise a dosing element which is designed both rotationally and also axially movable. In the case of a pump this can be by way of example a pump piston which in addition to a lift movement along its longitudinal axis can also execute a rotational movement. To control its axial position and/or its angular position in relation to a rotational movement about its longitudinal axis, in a further advantageous way a slide or slide control can be provided. For this, by way of example in the case of a rotational movement impressed on the piston preferably by way of a corresponding coupling element, an automatically guided axial piston movement can be effected by moving down a control curve, through a control cam formed on the piston, for generating a delivery stroke.

A reverse drive mode is however also conceivable where the piston is coupled to a drive unit which impresses on it its axial lift movements and it is automatically turned and guided in the delivery cylinder according to its axial position, by way of example likewise by way of a slide control. Such a slide control has the advantage that a corresponding rotational angle can be accurately assigned to each position point along an axial movement, and vice versa.

In order to generate a specific output volume per delivery stroke sealing means can be formed between the piston and cylinder such that the sealing means on the one hand in plan view run round the piston, or round in the cylinder inside wall, and at the same time dependent on the circulation angle also run in the direction of the longitudinal extension of the piston and/or of the cylinder inside wall, and are arranged in a corresponding receptacle respectively.

In a released state, they form in this installation position more or less a contour which is produced when a rubber ring is seized at two opposite points with two fingers and these are turned opposite one another. Starting from these points initially the contour of a circular section is thereby virtually formed which changes into a straight line running inclined to the opposite circular section.

With two sealing structures arranged axially spaced from one another between the piston outer wall and the cylinder inside wall and virtually having this roughly described path, and in conjunction with two openings formed axially on the piston and/or in the cylinder, e.g. in the form of delivery slits, a pump can be produced with a precisely definable delivery output by means of a rotational lifting movement of the piston in the cylinder.

A delivery slit can have components running along its path both in the longitudinal direction of the piston and/or cylinder wall and also in the circumferential direction thereof. A first delivery slit can, in the event of a conveying connection with the supply volume for the liquid cleaner, produce a supply flow into the space which forms the delivery output. After separation of this fluid conveying connection the delivery output is closed on the outside until a second opening, preferably likewise a delivery slit, is brought into conveying connection with a liquid cleaner outlet channel leading out from the liquid cleaner replaceable container. Through suitable structural measures it is possible in the case of continued movement of the delivery piston to deliver the liquid cleaner which is located in the delivery output into this liquid cleaner outlet channel and further, by means of connections which will be described in further detail later on, into the beverage machine.

One possible structural solution consists in the piston being lifted whilst its outlet opening is covered from the delivery volume lying between the two above-described sealing elements with the liquid cleaner outlet channel into its high position so that the liquid cleaner can run over the liquid cleaner outlet channel into the machine, preferably as a result of gravitation. After a corresponding emptying of the stroke volume this fluid-conveying connection with the liquid cleaner outlet channel is interrupted again and after corresponding further movement of the lifting piston both in the rotational direction and in the lifting direction a covering of the inlet opening with the supply chamber of the liquid cleaner replaceable container is again produced in order to initiate the next dosing process.

As an alternative to a lift and turn reciprocating piston pump it could also be possible to use for example a hose pump as the metering member.

Also here it would be possible to achieve a very precise dosage. However other types of pumps are also conceivable for delivering liquid cleaner from the replaceable container designed as the exchange container into the beverage machine.

In order to achieve a connection which is easy to produce and reliable in its action between the liquid cleaner dosing device provided in the liquid cleaner replaceable container, and the drive unit which is mounted in the beverage machine, an in particular position-movable coupling element can be provided in a further advantageous manner. This position-mobility can relate to a radial and/or axial position. A pivotal action relative to a longitudinal axis of the drive unit and/or a drive element driven by the latter and producing a torsional movement, and/or of a connecting element of the dosing unit which takes up the thus produced rotational movement can be achieved here in an advantageous manner.

Thus on the one hand user-friendly greater insertion or plug-in angles can be possible when changing liquid cleaner replaceable containers with a nevertheless guaranteed operationally-ready fitting. On the other hand greater manufacturing tolerances can also be permitted and compensated hereby both for the beverage machine and also in particular for the liquid cleaner replaceable container provided as the replacement container. Particularly in the case of very restricted spatial conditions, such as is the case where the design of beverage machines is becoming increasingly more compact, this can represent a clear improvement in operating comfort.

In a further advantageous way the coupling element can be designed as a spring-elastic element and/or can be connected by means of one such element to the output on the drive side or to the drive on the dosing unit side. A further increase in the user-friendliness can be enabled by providing a centering element. This can be formed by way of example as a type of centering pin which can have in turn entrainment members, by way of example in the form of teeth or other suitable geometric contours in order to be able to achieve a corresponding torque or rotary movement transfer. Means are also advantageously provided for compensating height, by way of example in the form of the previously mentioned spring-elastic elements. Such a height compensation can include for example the lifting movement of the lifting piston plus where applicable an additional spring path, for example one to be provided for safety reasons.

The torque transfer can take place with particular advantage by force-locking or shape-based means. This enables an exact detection of the pump state, that is by way of example in the case of a lift and turn piston its precise recognition of its angular position and/or its position along the lifting movement which is to be carried out by it. This can be achieved by way of example by providing rotor-position detection means. A precision control of the amount of liquid cleaner to be delivered is also possible corresponding to the detected position. This can be of interest particularly when a successive liquid cleaner dosing is desired within one delivery stroke. Thus by way of example a pre-cleaning can be effected which is possible after a certain action time by further added dosing or renewed dispensing of the liquid cleaner into the beverage machine in the sense of a possible sub-division into a "pre-cleaning section" and a so-called "main cleaning section". It is also possible to carry out advantageously a mixing with another liquid, more particularly with water, e.g. for providing a greater cleaning quantity, by means of which a larger surface of impurities can be cleaned.

In this way means can also be provided for controlling the delivery quantities and/or means can be provided for reversing the delivery direction. For this in a particularly preferred embodiment only the direction of rotation of the drive unit can be reversed, in order e.g. to be able to draw water out from a suitably provided connection to the liquid cleaner outlet channel and to mix it in a suitable manner with the liquid cleaner located therein.

With regard to mixing in a liquid cleaner with a further liquid cleaner, more particularly with water, also for embodiments of liquid cleaner replaceable containers which are filled with non-liquid fluid cleaners, such as powders, granules, tablets or the like, a stirrer unit can be provided in order to ensure the best possible mixing and more particularly dissolving of the primary liquid cleaner in the second liquid cleaner, more particularly in water.

By providing rotor locking means it is possible to ensure that the rotational angle set at the output of the drive unit or on the coupling element cannot be changed from outside under normal operating conditions. With a preferred orientation impressed on the interface between the liquid cleaner dosing device and the drive unit, which is produced by the coupling element and the output or drive flange which is to be connected to it when changing the liquid cleaner replaceable container, depending on which side the coupling element is provided, it can be ensured that only a liquid cleaner replaceable container can be inserted in the beverage machine whose drive flange or a coupling element mounted thereon has precisely the same rotational angle alignment as the output flange or the coupling element arranged thereon.

It is hereby possible by way of example to check that the liquid cleaner replaceable container which is to be inserted is new. For liquid cleaner replaceable containers already used before, for example in this machine, it is possible by way of example to set a rotational angle which clearly differs from that for receiving a new liquid cleaner replaceable container which is to be inserted. This can happen by way of example in that, prior to any signaling of a required change which may occur, the rotational angle provided for this is set and a corresponding control unit is monitored.

By way of example for this purpose the motor can be controlled accordingly wherein a sensor is provided in advantageous manner for detecting the rotational angle and/or lift position for the pump piston. With alternative types of pumps alternative sensor designs can be used accordingly. By way of example in the case of a hose pump the rotational position of the conveyor rotor can likewise be interrogated. Alternatively or additionally a position identification can also be undertaken on the rotor position of the motor, preferably in combination with detecting its circulation speed so that by taking into account the translation ratio it is possible again to determine a precise position of the conveyor element, e.g. the lifting piston.

In one possible embodiment the sensor can be formed as a Hall sensor. In order to identify a rotational angle position a magnet can be mounted for example on the coupling element or at another suitable place, and its magnetic field for determining by way of example a lift position and/or a rotational angle detected by the Hall sensor can be sent to the control unit.

By providing several individual magnets, by way of example along the periphery of the coupling element and/or along its longitudinal axis, it is possible to obtain segmenting of the rotational angle and/or a longitudinal division of the lifting path. It is hereby possible to achieve a further refined control of the delivery quantity for the liquid cleaner which is to be delivered and/or a different liquid which is to be sucked back through reversing the delivery direction, by way of example also for the purpose of self-cleaning of the liquid cleaner outlet channel.

By arranging the liquid cleaner dosing device between the liquid cleaner replaceable container and the beverage machine it is possible to achieve a simple coupling of the outlet of the dosing unit with the beverage machine. This can be achieved by way of example in the form of a coupling unit which is formed complementary on both the liquid cleaner replaceable container and the beverage machine accordingly. For the best possible user-friendly connection these two elements can be formed substantially rigid and preferably provided with guide contours. Through this interposed arrangement a direct dosing into the machine is possible which more particularly also enables an exact control over the amount of liquid cleaner which is supplied or is to be supplied.

In a further advantageous manner through this interposed arrangement a valve, which may otherwise be required, more particularly on the liquid cleaner replaceable container, may no longer be essential.

In a further advantageous manner data communication means can be provided through which by way of example cartridge-specific data can be detected. For this data can be read and/or sent. One possible technology for this is RFID technology. Other information systems are however also conceivable, such as those based on optical and/or electromagnetic technology.

The optical identification and/or authentication of specific cartridges or the specific liquid cleaner in the cartridges could be obtained for example by detecting special optical properties of the liquid cleaner. The authentication and/or identification would be conceivable by way of light refraction or light scatter, by absorption, emission or intensification of light, by spectral displacement or focussing of light, by luminescence, fluorescence or other optical identification features in the liquid cleaner.

In a particularly preferred way, the liquid cleaner could be authenticated and/or identified by mixing in a special marking agent, e.g. through a special pigment combination or a medium acting optically in a different way, or a combination of media.

In a particularly preferred way energy-supplying leads which are required in any case for the data transmission can be used. For example a decentralized control unit monitoring the motor can hereby also be coupled up. This control unit can by way of example be arranged as a microprocessor on a small circuit board close to the motor which is formed by way of example as a PWM-controlled motor. Thus on the one hand only few leads are required and on the other hand these can also be kept very short as a result of the closeness of the control unit to the units (motor, sensor, data communications element, data store and the like) which are to be controlled by the control unit and/or supply it with information or forward information sent out by it.

By providing a liquid cleaner inflow into the area of the beverage machine in which the drink which is to be prepared by it is actually prepared, the beverage machine can be cleaned purposefully at the place where it experiences its heaviest contamination. In particular, as a result of the thermal actions, ingredients of the drinks base which is to be prepared in particular by hot water can be deposited at the relevant pipeline and chamber surfaces over the course of time and coatings can build up into incrustations. Particularly relevant here are brewing chambers in which the ingredients of the drinks base are solubilized. In order to be able to dissolve these as well as possible the liquid cleaner can include grease- and/or oil- and/or protein- and/or polysaccharide-dissolving ingredients and/or decalcifying means.

A control circuit, which automatically triggers a cleaning process for example according to predeterminable criteria, can increase the user-friendliness of such a beverage machine even further. Thus it can be ensured here in particular that cleaning processes are carried out by way of example at certain time intervals and/or dependent on a predetermined number of drinks preparations. This has the advantage that impurities which are deposited during the preparation of the drinks can only settle up to a certain degree so that their removal can be carried out clearly faster and also more thoroughly and/or with less liquid cleaner compared with sporadic cleaning processes. Particularly in the case of heavily frequented beverage machines this has an advantageous effect both as regards the quick return to use after a comparatively short cleaning time and also as regards preventing the heavier build-up of deposits owing to the high consumption of drinks. Criteria for initiating a cleaning process can be by way of example: once a day to several times a day, dependent on use—e.g. after a certain number of brewed cups—and/or further criteria.

A particularly advantageous embodiment for the drive coupling is a claw coupling configuration.

A claw coupling is structurally simple and can thereby be made functionally reliable. The torque transfer via a claw coupling is furthermore excellent wherein additional damping elements, detent elements or the like can be easily provided.

Furthermore when producing a claw coupling a simple form of the aforementioned detection of a new replaceable container can also be provided in which for exchanging the container a predetermined angular position of the coupling element on the machine side on the one hand and the coupling element on the container side on the other hand is provided.

In a particular embodiment of the invention the replaceable container is made flexible. Such a "bag-like" design of the container has the advantage that this can collapse during emptying so that the container can be formed closed per se and without aeration.

In another embodiment of the invention a rigid container is provided which has advantages for handling and is provided with a ventilation and/or aeration opening, where applicable with a ventilation and/or aeration valve, for a functionally correct operation, e.g. during emptying.

In a special embodiment of the invention this valve is designed so that it is opened during insertion into a beverage machine. For this the aeration and/or ventilation valve can by way of example be pressed in by way of a plunger on the machine side. The valve body can thereby be held in its closed position by a force element, by way of example a spring, when the container is removed.

More advantageously a valve is provided at the outlet of the container and seals the replaceable container. In a particular embodiment of the invention this valve is designed so that it is opened during insertion into a beverage machine. For this a valve body can be pressed in by way of example by a plunger on the machine side. The valve body can thereby be held in its closed position by a force element, by way of example a spring, when the container is removed.

Furthermore an excess pressure can be provided in the replaceable container in order to improve the tightness of the outlet valve. Such excess pressure can thereby be provided readily also combined with a force element so that a multiple action into the closed position of the valve body is present.

In the case of a beverage machine according to the introduction, an electronic coding can more advantageously also be undertaken, by way of example by a so-called RFID element in order to enable identification of the replaceable container by the beverage machine. Where applicable the operation of the beverage machine can be made dependent on the presence of a correct replaceable container.

In a special embodiment the beverage machine is designed as an automatic coffee machine, more particularly as a fully automatic coffee machine, such as are frequently found for example in office coffee stations.

According to a second aspect the present invention relates to a liquid cleaner replaceable container which is characterized in that it is provided for use in a beverage machine, as is described above.

Embodiment:

One possible embodiment of a beverage machine according to the invention and a liquid cleaner replaceable container designed as a replaceable element will now be described in further detail with reference to the accompanying figures purely by way of example and diagrammatically.

Figure 2:
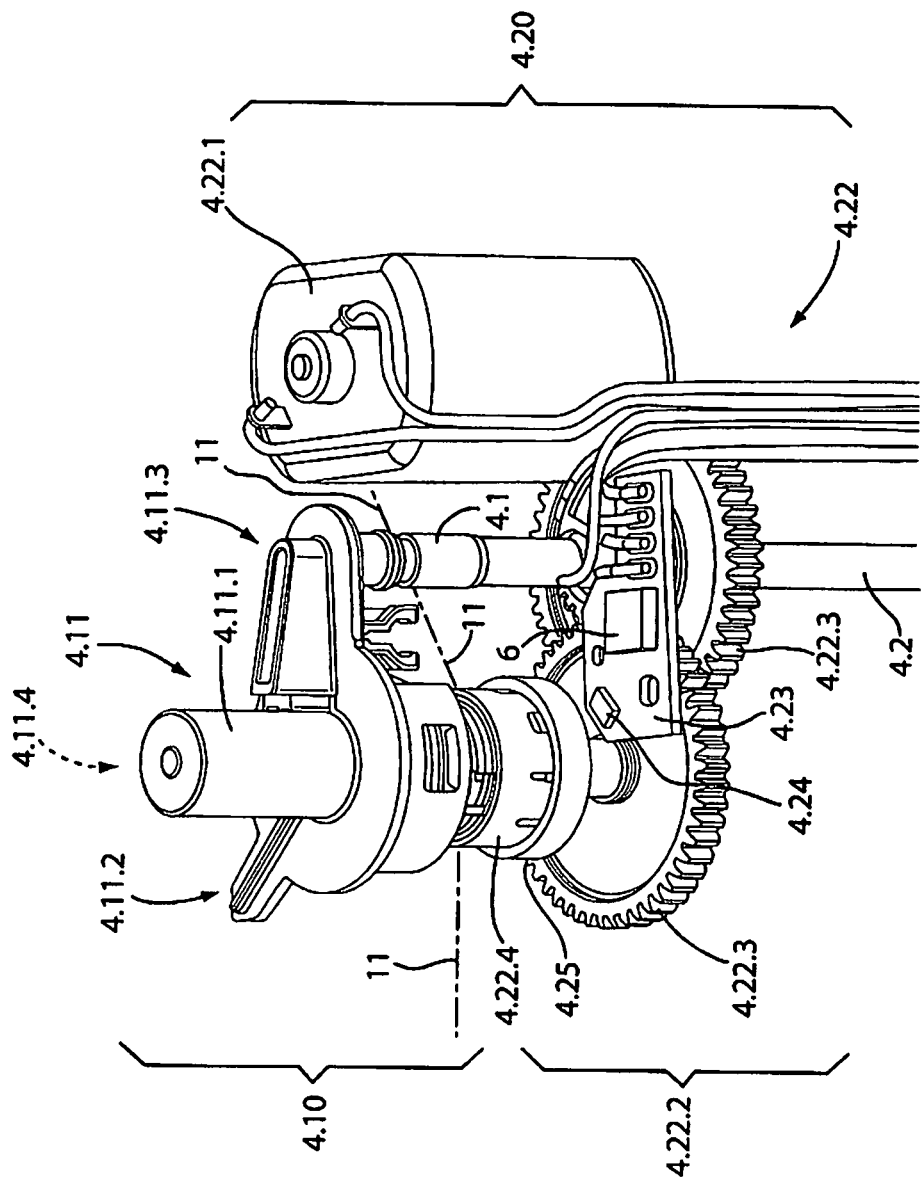
Figure 3:
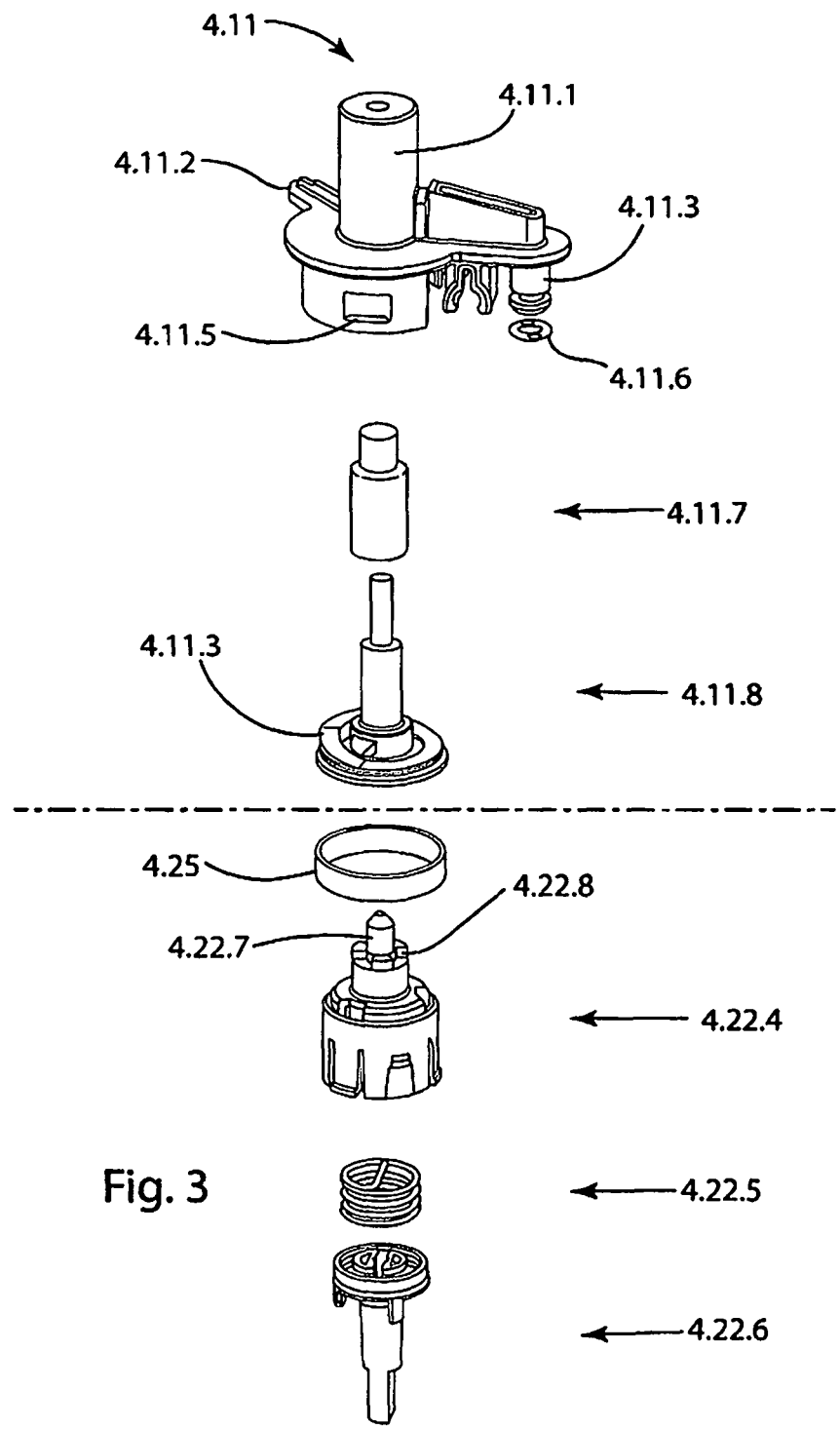
Figure 4:
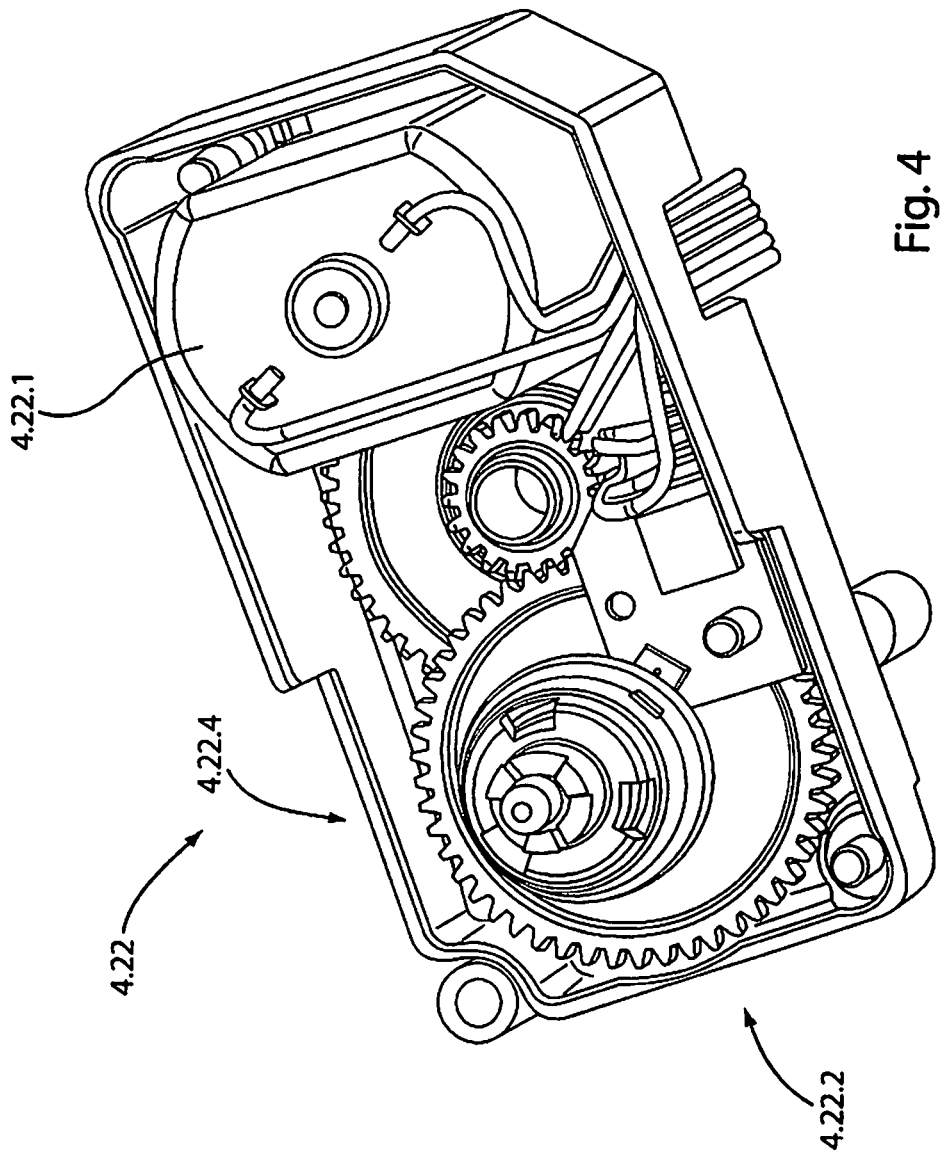
Figure 5:
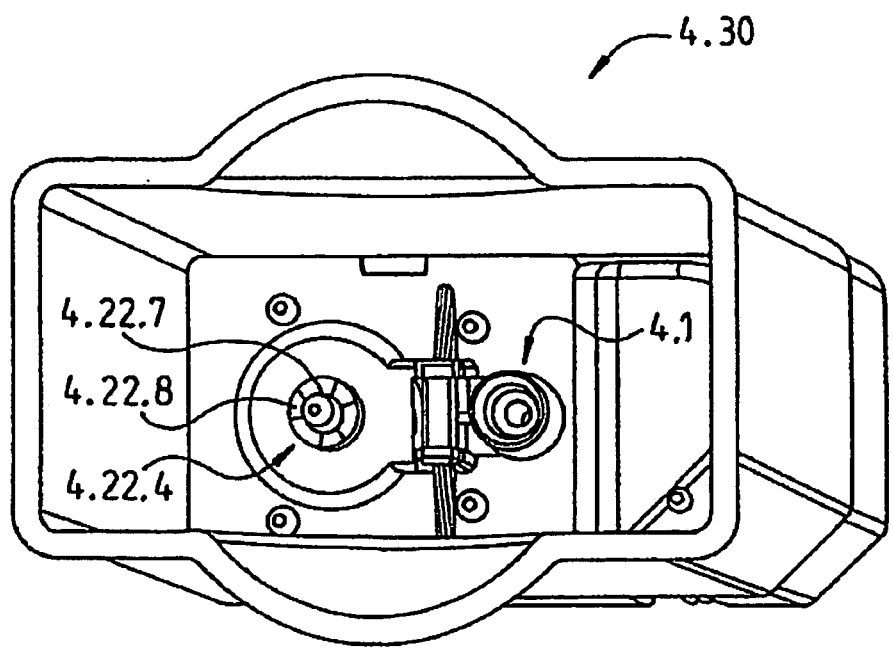

The Drawings Show:

FIG. 1 a beverage machine 1 with a cleaning device 2;

FIG. 2 a plan view of a discharged dosing unit with a coupled drive unit,

FIG. 3 a dosing unit with coupling in an exploded view;

FIG. 4 a plan view of a drive unit with coupling,

FIG. 5 a plan view of a receiving shaft for a liquid cleaner replaceable container with coupling arranged therein and a liquid cleaner connection and FIG. 6 a plan view of a liquid cleaner replaceable container from below with connections formed thereon, complementary to FIG. 4, for a drive of a liquid cleaner delivery device and a liquid cleaner outlet.

A fully automatic coffee machine is illustrated in FIG. 1 as a preferred embodiment of a beverage machine, purely by way of example and without limitation. This coffee machine has according to the illustrated embodiment a liquid cleaner replaceable container 3 for the liquid cleaner 3.1, e.g. as well as furthermore a liquid cleaner dosing device 4.

The liquid cleaner dosing device 4 is provided so that first parts 4.10 are formed interchangeable with the liquid cleaner replaceable container 3. These comprise for example a dosing pump 4.11. This can in a preferred embodiment be formed as a reciprocating lifting piston pump or in another form, for example in the form of a hose pump.

A further part 4.20 of the liquid cleaner dosing device 4 is arranged in the beverage machine, here in the fully automatic coffee machine, so that during insertion of the replaceable container 3 in a corresponding receiving shaft the liquid cleaner outlet 3.2 and a drive input 4.12 are brought into active connection with the correspondingly complementary connections 4.1 and 4.21 formed on the fully automatic coffee machine 1 and thus form a pipeline coupling for the pipeline of the liquid cleaner.

To connect the drive input 4.12 on the pump side a mechanical drive coupling 4.21 is provided which is arranged on an output of a drive unit 4.22. It serves as a coupling point between the two parts 4.10 and 4.20 of the liquid cleaner dosing device 4.

The liquid cleaner can be supplied by means of the components 4.1 to 4.4 from the pump connection 3.2 up to the supply point 4.4 for cleaning a brewing unit 5 with the corresponding delivery amount. Hereby are shown, starting from the liquid cleaner outlet 3.2, a liquid cleaner connection 4.1 on the appliance side, a liquid cleaner supply pipe 4.2, a liquid cleaner supply inlet 4.3 and by way of example a liquid cleaner discharge element 4.4.

A valve 3.2.1*a* or 4.1*a* can be provided in a further advantageous way on the container-side connection 3.2 illustrated as valve 3.2.1*a* and/or on the appliance-side connection 4.1 which is illustrated as valve 4.1*a*. The position 3.2.1 is shown purely by way of example for this. With particular advantage this valve can be opened each time on contact with the complementary connection element in order thus on the one hand to prevent the liquid cleaner from flowing out of the tank and on the other hand to prevent possible contamination and/or an air pocket in the pump supply line. Basically one such valve could however also be omitted, since the pump is mounted directly in front of the outlet 3.2 in the container 3 and can seal the latter.

In order to enable pressure compensation in the container, here in the form of a cleaning cartridge 3 by way of example, a ventilation device 3.3 is provided for the smooth orderly removal of the liquid cleaner. This can particularly advantageously likewise comprise a valve in order to prevent for example the cleaning liquid from flowing out.

In order to avoid confusion, the tank or the replacement cleaning cartridge can have a contour, for example square, which is different from the drinking water preparation cartridges likewise normally used by such fully automatic coffee machines. This rules out any confusion between a water preparation filter cartridge and one such cleaning medium replaceable cartridge in one and the same machine.

In order to enable an automatic run of the cleaning process a control unit 6 can be provided. Advantageously for this the control unit is used which is provided for the basic operation of the fully automatic coffee machine. However a separate one is also conceivable.

The filling level of the container 3 for the liquid cleaner can be detected by means of a filling level sensor 7. This can be designed for example in the form of an infra-red sensor. The corresponding infra-red light source 7.1 is here mounted by way of example on the opposite side of the tank which is designed as a replacement cartridge. The positioning of these sensor elements can be provided for example in guides and/or holders for the cartridge 3. For fixing the cartridge, sliding, push-fit, flap, or detent connections or the like can be provided in order to integrate the container protected in the machine housing.

The filling level of the liquid cleaner can be indicated by means of a filling level indicator 8, for example displayed in corresponding proportions and/or by a signal element, which in the event of sufficient filling, issues a corresponding signal and in the event of imminent and/or already occurred emptying, issues a corresponding warning signal, for example acoustically and/or optically.

The elements of the brewing unit are, again here by way of example, a brewing chamber 5.1 which is designed for example to be pivotal, an operating water connection 5.2 and a housing 5.3 which contains same, as well as an inlet 5.4 formed therein through which the coffee powder provided by the coffee mill can be received. The brewed coffee is supplied via the brewing unit outlet pipe 5.5 to a coffee pipeline 10 and to the coffee outlet 10.1. The delivery of the coffee can be implemented for example by means of a movable piston 5.6. A sieve 7.7 can be provided to hold back the residue.

Further components which are still arranged here by way of example in the housing 13 of the fully automatic coffee machine are a residue dish 11 and a drip dish 12.

Cleaning the fully automatic coffee machine, more particularly the brewing chamber, thus takes place according to a signal generated according to the operating time and/or number of completed brewings, in that cleaning medium is metered by means of the provided components 3 to 4.4 into the inlet funnel 5.4 of the brewing unit in order to clean the components thereof. This preferably takes place by adding water, preferably heated water and/or steam in order to dissolve the residues located therein from the previously prepared coffee powder and thus to clean the fully automatic coffee machine for dispensing the next coffee.

FIG. 2 shows the two parts 4.10 and 4.20 of the liquid cleaner dosing device 4 in an optional illustration. The chain-dotted line 11 represents the dividing line or interface between these two main components and thus also between the container and appliance.

A core member of the parts 4.10 of the liquid cleaner dosing device 4 which are interchangeable with the liquid cleaner replaceable container 3 is the liquid cleaner delivery means, here shown by way of example in the form of a reciprocating lifting piston pump 4.11. This comprises a housing 4.11.1, a liquid cleaner inlet 4.11.2 and a liquid cleaner outlet 4.11.3. Inside the rotary lifting piston pump there is a dosing element formed for both rotational and axial movement in the form of a rotary lifting piston 4.11.4 (not visible here and therefore indicated by a dotted arrow).

The parts 4.20 of the liquid cleaner dosing device 4 on the appliance side comprise a drive unit 4.22 for providing a drive movement which drives the dosing pump. This takes place via a rotational movement which drives the rotary lifting piston 4.11.4 by means of a motor 4.22.1 with the interposition of translation means, here in the form of a gear wheel drive 4.22.2 with gear wheels 4.22.3, and a coupling 4.22.4.

A control unit 6 is mounted on the circuit board 4.23 e.g. in the form of a microprocessor, here integrated by way of example in the drive unit 4.22. It can monitor the liquid cleaner dosing device 4 accordingly. This means it controls or regulates the motor 4.22.1 with feedback on a rotary and/or lifting position of the rotary lifting piston. For this it receives the corresponding information via a Hall sensor 4.24 which obtains corresponding position information from a magnetic field originating from magnets 4.25 arranged on the coupling 4.22.4.

In the embodiment illustrated here, the magnet is designed as a magnetic ring surrounding the coupling and by means of which the Hall sensor can detect axial positions of the rotary lifting piston driven therewith. By recognizing the contour of a slide guide inside the pump controlling the movement of the rotary lifting piston, it is also hereby possible at the same time to determine a corresponding angular position of the rotary lifting piston, and thus also a statement on the delivery volume of liquid cleaner which is to be delivered hereby. Where necessary it can also be possible to use for this in addition a rotational speed of the motor rotor which taking into consideration the translation ratio of the gearwheels can likewise enable a determination of the angular speed of the rotary lifting piston.

Leads 4.26 are shown for the electrical supply of energy and data.

The liquid cleaner which is to be dosed by the pump into the appliance is delivered at the interface between the liquid cleaner replaceable container and the beverage machine from the liquid cleaner outflow 4.11.3 into the liquid cleaner connection 4.1 on the appliance side and further into the liquid cleaner supply line 4.2 in order ultimately to be introduced via the liquid cleaner inlet supply 4.3 according to the illustration in FIG. 1 into the drinks processing unit which is to be cleaned.

FIG. 3 shows in more detail in an exploded view along the longitudinal axis of the pump 4.11 elements of the pump and the coupling 4.22.4. In the lower region of the housing 4.11.1 there is a window-like recess as a fixing means 4.11.5 for engagement in a complementary element. A seal 4.11.6 is drawn in by way of example on the liquid cleaner outlet 4.11.3.

The pump piston 4.11.7 of the rotary lifting piston pump 4.11 is shown axially underneath the housing. In the assembled state it is fitted over the drive axis 4.11.8 on which a slide guide 4.11.9 is provided for controlling the rotary-angle-dependent lifting movement of the rotary lifting piston. It can be moved by way of example along a complementary cam, which is formed inside the pump housing, and can execute an oscillating lifting movement when biased by a spring force in the longitudinal direction of the drive axis 4.11.8, as seen over one revolution.

The spring force in this embodiment stems from the spring element 4.22.5 of the coupling 4.22.4, here shown by way of example as a coil spring. This spring serves as an elastic torque-transferring connection between the output drive 4.22.6 connected to the gearing 4.22.2, and the coupling 4.22.4. The coupling can hereby be formed both pivotal relative to the axis and also with radially and axially variable position, and thus can compensate both manufacturing tolerances and also when inserting a replacement liquid cleaner container allow an easier coupling with the connection components provided on the housing side.

This is further facilitated by a centering pin 4.22.7 formed at the end of the coupling, and rounded contours of the entrainment teeth 4.22.8.

The magnetic ring 4.25 is held in a fixed position on the coupling by means of a spring-elastic retaining element 4.27.

FIG. 4 shows a plan view of the drive unit 4.22 with an opened housing. The essential components, the motor 4.22.1, the gearing 4.22.2 and the coupling 4.22.4 provided for transferring the rotational movement to the rotary lifting piston pump which is to be fitted on, are shown here.

Figure 6:
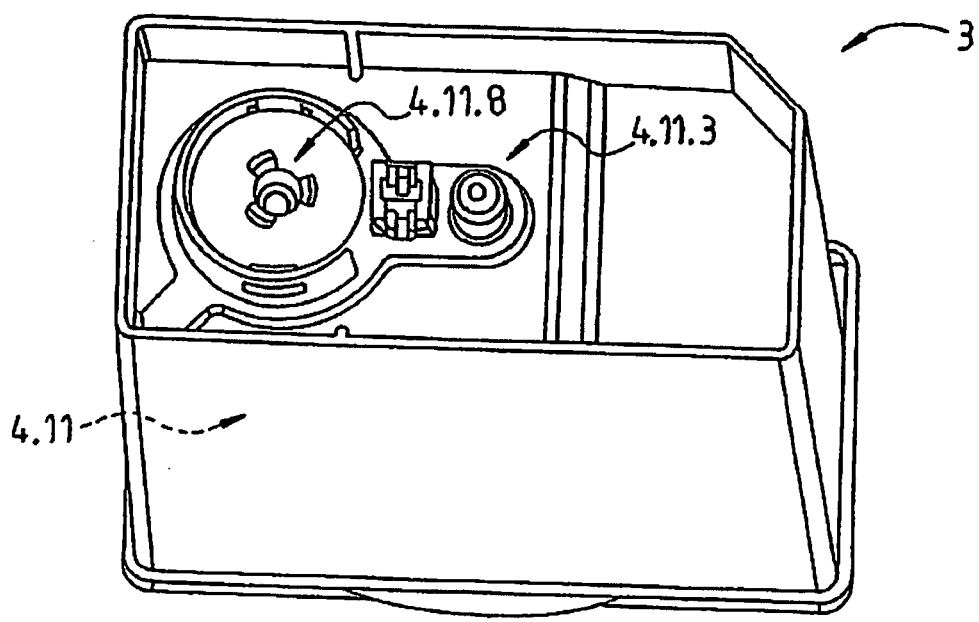

FIG. 5 shows a so-called "receiving shaft" 4.30 provided on the appliance side for a liquid cleaner replaceable container 3 which is to be inserted therein as the replaceable container, according to the illustration in FIG. 6. The coupling 4.22.4 and the centering pin 4.22.7 formed on it at the end side, as well as the entrainment teeth 4.22.8 surrounding these are to be recognized as the torque-transferring unit for the rotary lifting piston pump which is to be driven therewith. This pump is in turn housed in the container housing as the part 4.11 which is to be replaced with the liquid cleaner replaceable container.

In the inserted state of the replaceable container 3 both the mechanical components provided for driving the rotary lifting piston pump, and also the connections 4.1 and 4.11.3 conveying the liquid cleaner engage in one another. In order to reliably prevent for example when the replaceable container 3 is removed any remaining rotation of the angular position of the drive teeth, rotor locking means can furthermore also be provided. This can be achieved by way of example by a corresponding control of the motor 4.22.1 such that the motor cannot move and thus no change in the angular position of its output drive is possible via the gearing which is attached to it. A further possibility exists in that through the spring element 4.22.5 such a torque uncoupling is effected so that in the event of a possible rotation of the coupling orientation after its release this again occupies its original position.

LIST OF REFERENCE NUMERALS

1 Beverage machine/fully automatic coffee machine
2 Cleaning device
3 Liquid cleaner—replaceable container 3
4 Liquid cleaner—dosing device 4
5 Brewing unit
6 Control unit
7 Filling level sensor
8 Filling level indicator
10 Coffee pipeline
11 Residue dish
12 Drip dish
13 Housing
3.1 Liquid cleaner
3.2 Liquid cleaner outlet
3.3 Ventilation
4.1 Liquid cleaner connection
4.2 Liquid cleaner supply line
4.3 Liquid cleaner inlet supply
4.4 Dosing output element
4.10 Part
4.11 Dosing unit/reciprocating lifting piston pump
4.11.1 Housing
4.11.2 Liquid cleaner inlet supply
4.11.3 Liquid cleaner drain outlet
4.11.4 Rotary lifting piston
4.11.5 Fixing means
4.11.6 Seal
4.11.7 Pump piston
4.11.8 Drive axis
4.11.9 Slide guide
4.12 Drive input
4.20 Part
4.21 Coupling
4.22 Drive unit
4.22.1 Motor
4.22.2 Gearwheel gearing
4.22.3 Gearwheels
4.22.4 Coupling
4.22.5 Spring element
4.22.6 Output
4.22.7 Centering pin
4.22.8 Entrainment teeth
4.24 Hall sensor
4.25 Magnets
4.26 Leads
4.27 Retaining element
5.1 Brewing chamber
5.2 Operating water connection
5.3 Housing
5.4 Inlet
5.5 Brewing unit outlet pipe
5.6 Movable piston
7.1 Infrared light source
7.7 Sieve
10.1 Coffee outlet

What is claimed is:

1. In a beverage machine with a liquid cleaner container and a dosing device to supply a liquid cleaner wherein the improvement comprises a replaceable liquid cleaner container, a dosing pump, a pipeline coupling between the replaceable liquid cleaner container and the beverage machine and a drive coupling to couple a drive of the dosing pump to the beverage machine.

2. The beverage machine according to claim 1 wherein the pipeline coupling is fixed during operation of the dosing pump.

3. The beverage machine according to claim 1 further comprising a drive motor wherein the dosing pump has a rotor and a drive shaft coupled to the rotor and arranged off-set and/or angled to an axis of the rotor or an axis of the drive coupling or the drive motor.

4. The beverage machine according to claim 3 wherein a liquid cleaner outlet of the dosing pump is off-set relative to the axis of the rotor.

5. The beverage machine according to claim 3 further comprising at least one gear element disposed between the rotor or the drive coupling and the drive motor.

6. The beverage machine according to claim 5 further comprising a fixed liquid pipe mounted coaxial with the at least one gear element or rotating drive.

7. The beverage machine according to claim 1 wherein the dosing pump has a rotationally and axially moveable dosing element (4.11.4).

8. The beverage machine according to claim 1 further comprising a rotor position detection means (4.24).

9. The beverage machine according to claim 8 further comprising a rotor locking means (4.22.1).

10. The beverage machine according to claim 1 further comprising a delivery volume control means (6) and/or delivery direction reversing means (6).

11. The beverage machine according to claim 1 further comprising a mixing means (4.11.3).

12. The beverage machine according to claim 1 further comprising a data communication means (4.24).

13. The beverage machine according to claim 1 further comprising a liquid cleaner supply inlet (4.3) connected to a brewing chamber.

14. The beverage machine according to claim 1 further comprising a liquid cleaner with a decalcifying agent and/or a grease- and/or oil- and/or protein- and/or polysaccharide-dissolving liquid cleaner.

15. The beverage machine according to claim 1 wherein the drive coupling is a claw coupling.

16. The beverage machine according to claim 1 wherein the replaceable liquid cleaner container is flexible.

17. The beverage machine according to claim 1 wherein the replaceable liquid cleaner container is a rigid container having a ventilation and/or aeration opening or a ventilation and/or aeration valve.

18. The beverage machine according to claim 1 further comprising an outlet valve on the replaceable liquid cleaner container.

19. The beverage machine according to claim 1 further comprising a fixed liquid pipeline arranged coaxial with a rotating drive or gear element.

20. The beverage machine according to claim 1 further comprising an optical identification and/or authentication device.

21. The beverage machine of claim 20 wherein the optical identification device is a color and/or light marker, a luminescent and/or fluorescent marker, a light refraction, scattering, focusing, absorption, emission or spectral shift device.

22. A beverage machine cleaning device comprising a replaceable cleaning container for the beverage machine a dosing pump, said replaceable cleaning container having a pipe coupling element for a liquid cleaner supply line and a drive coupling element for the dosing pump and a ventilation and/or aeration device.

23. A cleaning device for a liquid dispensing machine comprising:
   (a) a replaceable cleaning container having a wall and an inlet and an outlet;
   (b) a replaceable dosing pump disposed in the replaceable cleaning container;
   (c) a drive coupling disposed in the bottom of the replaceable cleaning container and extending through the wall in the replaceable cleaning container; and
   (d) a coupling connecting the replaceable cleaning container to the replaceable dosing pump; and
   (e) a ventilation and/or an aeration device.

* * * * *